(12) United States Patent
Dousti et al.

(10) Patent No.: US 10,855,719 B2
(45) Date of Patent: Dec. 1, 2020

(54) AUTOMATED DDOS ATTACK MITIGATION VIA BGP MESSAGING

(71) Applicant: VERISIGN, INC., Reston, VA (US)

(72) Inventors: Ramin Ali Dousti, Ashburn, VA (US); Frank Scalzo, Leesburg, VA (US); Suresh Bhogavilli, Gaithersburg, MD (US)

(73) Assignee: VERISIGN, INC., Reston, VA (US)

( * ) Notice: Subject to any disclaimer, the term of this patent is extended or adjusted under 35 U.S.C. 154(b) by 92 days.

(21) Appl. No.: 15/273,510

(22) Filed: Sep. 22, 2016

(65) Prior Publication Data

US 2018/0084005 A1 Mar. 22, 2018

(51) Int. Cl.
*H04L 29/06* (2006.01)

(52) U.S. Cl.
CPC ...... *H04L 63/1458* (2013.01); *H04L 63/1416* (2013.01); *H04L 63/168* (2013.01); *H04L 63/1425* (2013.01); *H04L 63/20* (2013.01)

(58) Field of Classification Search
None
See application file for complete search history.

(56) References Cited

U.S. PATENT DOCUMENTS

| 8,949,459 | B1* | 2/2015 | Scholl | H04L 63/1458 |
| | | | | 709/239 |
| 9,577,943 | B1* | 2/2017 | Bhandarkar | H04L 47/2433 |
| 9,742,795 | B1* | 8/2017 | Radlein | H04L 63/1441 |
| 2004/0148520 | A1* | 7/2004 | Talpade | H04L 63/0227 |
| | | | | 726/22 |
| 2006/0236394 | A1* | 10/2006 | Morrow | H04L 63/1458 |
| | | | | 726/23 |
| 2007/0130619 | A1* | 6/2007 | Reams, III | H04L 63/1425 |
| | | | | 726/13 |
| 2016/0080412 | A1* | 3/2016 | Smith | H04L 63/20 |
| | | | | 726/1 |

OTHER PUBLICATIONS

Extended European Search Report for EP Application No. 17192158.8 dated Nov. 23, 2017, 10 pages.
Laurent Prat: "BGP over GRE < The CCIE R&S", Aug. 25, 2012, XP055424971, retrieved from Internet: URL: https://web.archive.org/web/20120825165931/https://aitaseller.wordpress.com/2012/02/21/bgp-over-gre/, 8 pages.

* cited by examiner

*Primary Examiner* — Fatoumata Traore
(74) *Attorney, Agent, or Firm* — Artegis Law Group, LLP

(57) ABSTRACT

Various embodiments of the invention disclosed herein provide techniques for mitigating a distributed denial of service (DDoS) attack on a targeted computer system. A border gateway protocol (BGP) controller receives, via a first router, a BGP message that includes an indicator indicating that a computer system associated with the first router is under a DDoS attack. In response to receiving the BGP message, the BGP controller, in performs one or more operations to mitigate the DDoS attack. As a result, the time between detection of a DDoS attack and mitigating the attack is reduced relative to prior approaches. After receiving the BGP message indicating a DDoS attack is in progress, the DDoS attack mitigation platform automatically takes steps to mitigate the DDoS attack without further manual intervention. Consequently, the targeted computer system recovers more quickly and begins to respond to legitimate network requests sooner relative to prior approaches.

18 Claims, 3 Drawing Sheets

AUTOMATED DDOS ATTACK MITIGATION VIA BGP MESSAGING

BACKGROUND OF THE INVENTION

Field of the Invention

The present invention relates generally to computer networks and, more specifically, to automated DDoS attack mitigation via BGP messaging.

Description of the Related Art

In the domain of computer networks, computer systems that present websites and other content to a public network, such as the internet, are vulnerable to various types of attacks from malicious users. One such type of attack is a distributed denial of service (DDoS) attack. In a DDoS attack, a large number of network-connected devices attempt to overwhelm a targeted computer system by flooding the targeted computer system with a high level of network traffic, such as requests for particular webpages or other content. As the targeted computer system attempts to process and respond to the increased level of network traffic, the targeted computer system is no longer able to process legitimate network traffic. As a result, non-malicious network connected devices are unable to access content from the targeted computer system, thereby resulting in a denial of service.

To mitigate the effects of such DDoS attacks, owners of computer services can enroll in DDoS protection services from a third-party company. Under normal conditions, a router associated with a computer system that hosts websites and other content publishes a route to the internet. The router publishes the route in response to a change to the router configuration made by a system administrator. By publishing a route, the router advertises that the websites and content are accessible, or reachable, via a particular internet protocol (IP) address or set of IP addresses associated with the computer system.

In the case of a DDoS attack, a system administrator for the targeted computer system usually observes a significant increase in network traffic directed to the targeted computer system. That system administrator then has to contact a system administrator at the DDoS protection services company, typically by phone, to report the DDoS attack. Working in concert, the two system administrators then have to make manual configuration changes to respective routers at the targeted computer system site and at the DDoS protection services company to address the attack. The configuration changes cause the router for the targeted computer system to withdraw from advertising the current route and cause the router for the DDoS protection services company to advertise a new route. The new route causes requests previously directed to the targeted computer system to be directed to a mitigation server at the DDoS protection services company. Through various analyses and procedures, the mitigation server determines which network traffic is legitimate and which network traffic is from malicious computer systems that are launching the DDoS attack. The mitigation server forwards the legitimate network traffic to the targeted computer system and discards the network traffic determined to come from malicious computer systems.

Once the DDoS attack is over, the system administrators have to manually change the respective router configurations again to (1) cause the DDoS protection services company router to withdraw from advertising the new route; and (2) cause the router associated with the targeted computer system to advertise the previous route. As a result, the targeted computer system begins receiving requests for webpages and other content directly once again, rather than through the mitigation server.

One drawback of the above approach is that a significant amount of time can pass from when the DDoS attack is first detected to when the different router configurations are changed by the system administrators to advertise a new route through the mitigation server. During this time period, the DDoS attack continues without abatement. Accordingly, the best case scenario is that the targeted computer system remains unable to service legitimate traffic while the routers are being reconfigured. However, in the extreme, the targeted computer system could be rendered completely inoperable during that time period.

As the foregoing illustrates, what is needed in the art is a more efficient way to mitigate the effects of DDoS attacks.

SUMMARY OF THE INVENTION

Various embodiments of the present application set forth a method for mitigating a distributed denial of service (DDoS) attack on a targeted computer system. The method includes receiving, via a first router, a first border gateway protocol (BGP) message that includes a first indicator indicating that a first computer system associated with the first router is under a DDoS attack. The method further includes, in response to receiving the first BGP message, performing one or more operations to mitigate the DDoS attack.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that the time between detection of a DDoS attack and mitigating the attack is reduced relative to prior approaches. After receiving the BGP message indicating a DDoS attack is in progress, the DDoS attack mitigation platform automatically takes steps to mitigate the DDoS attack without further manual intervention. As a result, the targeted computer system recovers more quickly and begins to respond to legitimate network requests sooner relative to prior approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
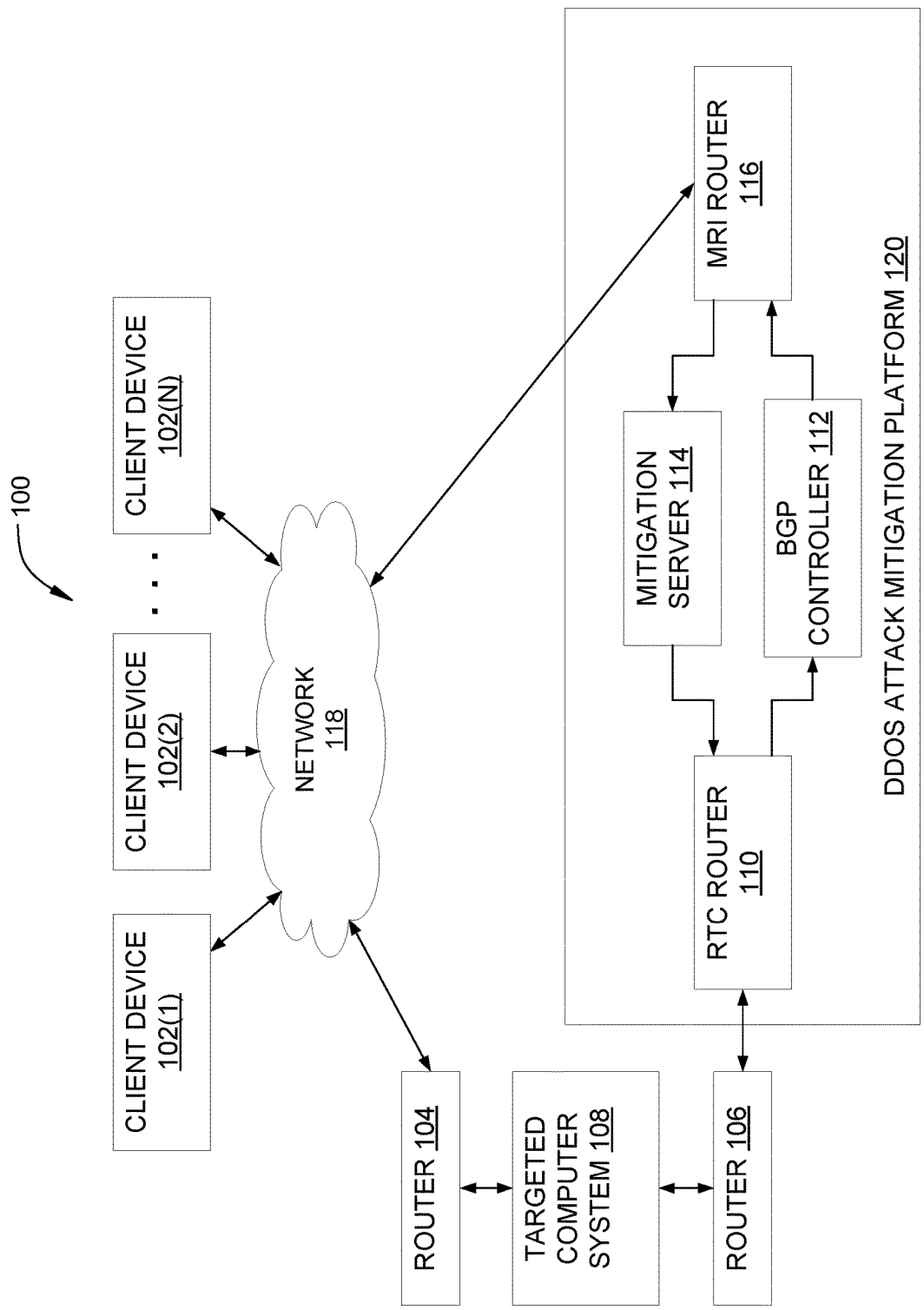
FIG. 1 illustrates a system configured to implement one or more aspects of the present invention.

FIG. 1 illustrates a system 100 configured to implement one or more aspects of the present invention. As shown, the system includes, without limitation, client devices 102(1), 102(2), ... 102(N), routers 104 and 106, a targeted computer system 108, and a DDoS attack mitigation platform 120 in communication with each other via a network 118. In turn, DDoS attack mitigation platform 120 includes, without limitation a return to customer (RTC) router 110, a border gateway protocol (BGP) controller 112, a mitigation server 114, and a main routing instance (MRI) router 116. As further described herein, DDoS attack mitigation platform 120 provides DDoS attack mitigation services for targeted computer system 108 when targeted computer system 108 is under a DDoS attack.

Network 118 may be any suitable environment to enable communications among remote or local computer systems, including, without limitation, cross connect systems within a data center, dedicated low-latency networks, LANs (Local Area Networks), and internet-based WANs (Wide Area Networks). Routers 104 and 106 provide routing services for targeted computer system 108 over network 118. Likewise, RTC router 110 and MRI router 116 provide routing services for BGP controller 112 and mitigation server 114 over network 118. Additional routers (not explicit shown) provide routing services for client devices 102(1), 102(2), ... 102(N) over network 118. In various embodiments, each of routers 104, 106, RTC router 110, and MRI router 116 may include any number of one or more interconnected routers, hubs, and similar devices.

Client devices 102(1), 102(2), ... 102(N) include any types of computing devices associated with the network 118. Each of the client devices 102(1), 102(2), ... 102(N) includes a computing device that may be a personal computer, video game console, personal digital assistant, mobile phone, mobile device, or any other device suitable for implementing one or more aspects of the present invention.

Client devices 102(1), 102(2), ... 102(N) with various computing systems via network 118. Some of client devices 102(1), 102(2), ... 102(N) present legitimate network traffic to network 118, such as requests for webpages and other content from targeted computer system 108. In the case of a DDoS attack, a large number of client devices 102(1), 102(2), ... 102(N) continually transmit requests to targeted computer system 108 for the purpose of overwhelming targeted computer system 108 to the point that targeted computer system 108 can no longer respond to the amount of requests received. In such cases, targeted computer system 108 may deny or ignore incoming requests and may ultimately fail completely.

Targeted computer system 108 includes one or more computing devices of any type, and in any combination, that are capable of communicating with the network 118. In various embodiments, targeted computer system 108 may include, without limitation, a personal computer, a server, a video game console, personal digital assistant, mobile phone, mobile device, or any other device suitable for implementing one or more aspects of the present invention.

Targeted computer system 108 receives network requests for webpages and other content from client devices 102(1), 102(2), ... 102(N) via router 104. Targeted computer system 108 responds to these requests by delivering the requested webpages and other content to network 118 via router 104. In the case of a DDoS attack, the number of requests increases significantly to the point that targeted computer system 108 is not able to respond to the requests. As a result, the response of targeted computer system 108 increases, and, in some cases, targeted computer system 108 may not be able to respond at all to incoming requests. The increase in network traffic directed to targeted computer system 108 is detected by a system administrator responsible for targeted computer system 108. Alternatively, a monitoring system (not explicitly shown) automatically detects the increase in network traffic directed to targeted computer system 108.

In response, the system administrator or monitoring system changes a configuration in router 106. The change in configuration causes router 106 to transmit one or more BGP messages to RTC router 110 that include an indicator indicating that targeted computer system 108 is undergoing a DDoS attack. In some embodiments, the indicator includes changing the BGP community attribute, also referred to herein as a BGP community string, to a special value, such as 911 or some other mutually understood value, to indicate that that targeted computer system 108 is undergoing a DDoS attack. Once the DDoS attack is over, the system administrator or monitoring system changes the configuration in router 106 to no longer transmit BGP messages with the indicator.

RTC router 110 communicates with router 106, associated with targeted computer system 108. To do so, RTC router 110 establishes a BGP session with router 106, enabling RTC router 110 and router 106 to exchange BGP messages. In some embodiments, RTC router 110 and router 106 may communicate with each other via a private point-to-point connection. In some embodiments, although not explicitly shown in FIG. 1, RTC router 110 and router 106 may communicate with each other over a network, such as network 119. In such embodiments, RTC router 110 and router 106 may communicate with each other via a tunneling protocol, such as generic routing encapsulation (GRE), that encapsulates network messages within a virtual point-to-point link over a network.

BGP controller 112 includes one or more computing devices of any type, and in any combination, that are capable of communicating with the network 118. In various embodiments, BGP controller 112 may include, without limitation, a personal computer, a server, a video game console, personal digital assistant, mobile phone, mobile device, or any other device suitable for implementing one or more aspects of the present invention.

BGP controller 112 receives a BGP message that indicates targeted computer system 108 is undergoing a DDoS attack. BGP controller 112 receives the BGP message via router 106 and RTC router 110. The BGP message includes a special indicator indicating that identifies a DDoS attack is in progress, such as a BGP community attribute that is set to a special value. For example, the BGP message could include a BGP community attribute that is set to a value of 911 or some other mutually understood value that indicates a DDoS attack is in progress. In response, BGP controller 112 advertises, via MRI router 116 a new route associated with targeted computer system 108. The new route directs traffic intended for targeted computer system 108 to be routed to mitigation server 114 via MRI router 116.

Later, when the DDoS attack is over, BGP controller 112 receives a BGP message that indicates targeted computer system 108 is no longer undergoing a DDoS attack. BGP controller 112 receives the BGP message via router 106 and RTC router 110. For example, the BGP message could include a BGP community attribute that is set to a value other than 911 or some other mutually understood value that indicates a DDoS attack is in progress. In response, BGP controller 112 withdraws, via MRI router 116 the advertisement of the new route. Withdrawal of the new route causes mitigation server 114 to stop receiving traffic intended for targeted computer system 108 via MRI router 116. Targeted computer system 108 begins receiving this traffic via router 104.

Mitigation server 114 includes one or more computing devices of any type, and in any combination, that are capable of communicating with the network 118. In various embodiments, mitigation server 114 may include, without limitation, a personal computer, a server, a video game console, personal digital assistant, mobile phone, mobile device, or any other device suitable for implementing one or more aspects of the present invention.

Mitigation server 114 filters network traffic directed to targeted computer system 108 when targeted computer system 108 is under a DDoS attack. In the case of a DDoS attack, MRI router 116 advertises a new route for network traffic directed to targeted computer system 108. If the new route specifies a number of IP addresses that is greater than the number of IP addresses specified by the previously-advertised route advertised by router 104, then the new route directs all such network traffic to MRI router 116, rather than router 104.

In some embodiments, router 104 withdraws a previously-advertised route for network traffic directed to targeted computer system 108, where the previously-advertised route directed all such network traffic to router 104. In such embodiments, the new route advertised by MRI router 116 may specify a number of IP addresses that is less than or equal to the number of IP addresses specified by the previously-advertised route advertised by router 104. As a result, advertising the new route may cause some, but not all, network traffic intended for targeted computer system 108 to be diverted to mitigation server 114 via MRI router 116. By withdrawing the previously-advertised route, all network traffic is diverted to mitigation server 114 via MRI router 116.

Once the new route is advertised, mitigation server 114 receives subsequent network traffic directed to targeted computer system 108 via MRI router 116. Mitigation server 114 determines which network traffic is legitimate and which network traffic is from malicious client devices 102 that are launching the DDoS attack on targeted computer system 108. Mitigation server 114 filters and discards network traffic determined to be associated with the DDoS attack. Mitigation server 114 forwards network traffic determined to be legitimate to RTC router 110. RTC router 110 forwards such legitimate traffic to router 106, and router 106, in turn, forwards the legitimate network traffic to targeted computer system 108.

After the DDoS attack is determined to be over, MRI router 116 withdraws the route that for network traffic directed to targeted computer system 108. In some embodiments, router 104 advertises a route for network traffic directed to targeted computer system 108, where the route directs all such network traffic to router 104. Network traffic again flows to targeted computer system 108 via router 104.

Mitigating a DDoS Attack on a Targeted Computer System

Figure 2:
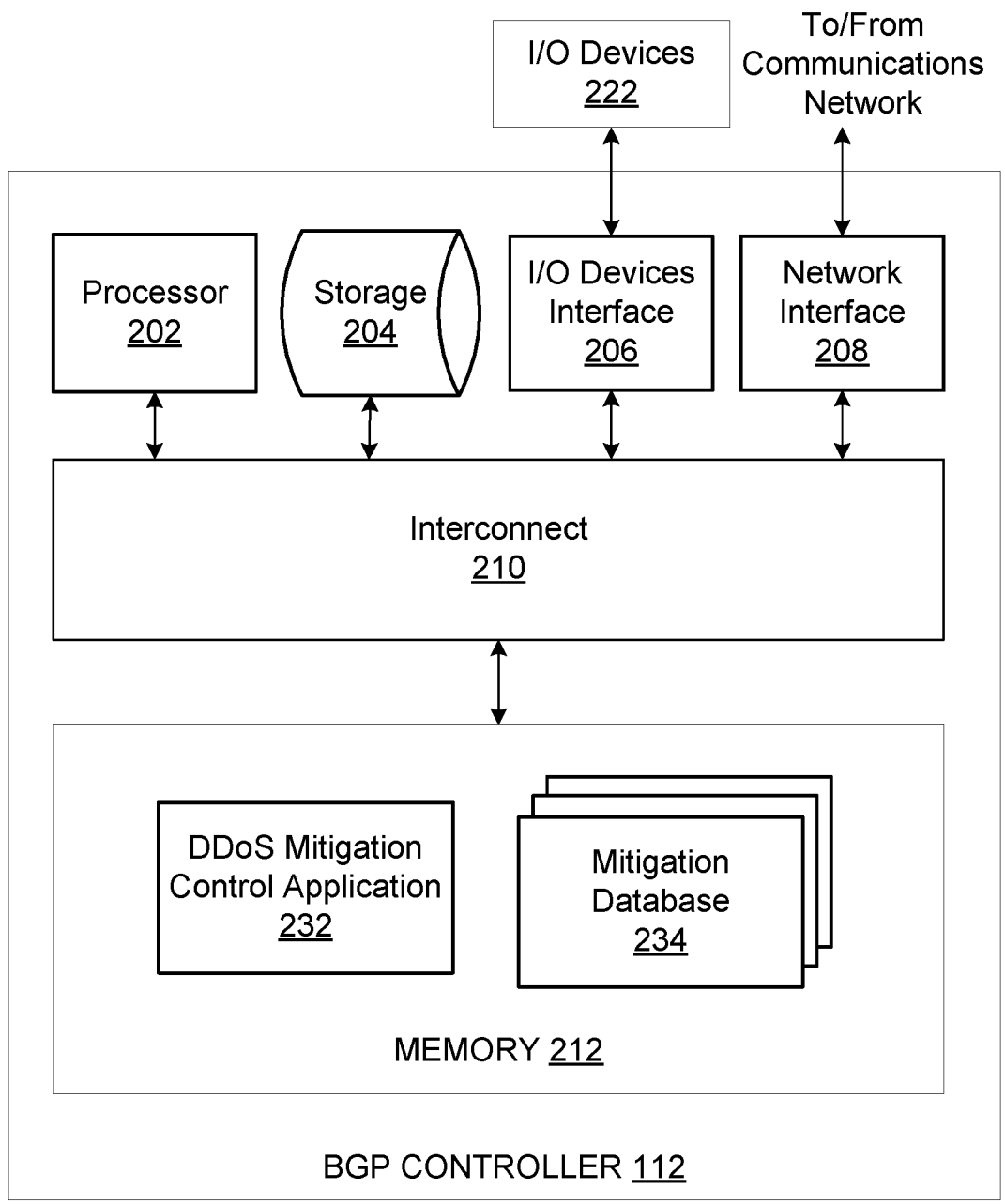
FIG. 2 is a more detailed illustration of the border gateway protocol (BGP) controller of FIG. 1, according to various embodiments of the present invention.

FIG. 2 is a more detailed illustration of the border gateway protocol (BGP) controller 112 of FIG. 1, according to various embodiments of the present invention. As shown, the BGP controller 112 includes, without limitation, a processor 202, storage 204, an input/output (I/O) devices interface 206, a network interface 208, an interconnect 210, and a system memory 212.

In general, processor 202 retrieves and executes programming instructions stored in the system memory 212. Processor 202 may be any technically feasible form of processing device configured to process data and execute program code. Processor 202 could be, for example, a central processing unit (CPU), a graphics processing unit (GPU), an application-specific integrated circuit (ASIC), a field-programmable gate array (FPGA), and so forth. Processor 202 stores and retrieves application data residing in the system memory 212. Processor 202 is included to be representative of a single CPU, multiple CPUs, a single CPU having multiple processing cores, and the like. In operation, processor 202 is the master processor of BGP controller 112, controlling and coordinating operations of other system components. System memory 212 stores software applications and data for use by processor 202. Processor 202 executes software applications stored within system memory 212 and optionally an operating system. In particular, processor 202 executes software and then performs one or more of the functions and operations set forth in the present application.

The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further includes a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

The system memory 212 is generally included to be representative of a random access memory. The storage 204 provides non-volatile storage for applications and data and may include any combination of fixed or removable hard disk drives, flash memory devices, and CD-ROM, DVD-ROM, Blu-ray, HD-DVD, or other magnetic, optical, or solid state storage devices. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a DDoS mitigation control application 232 and a mitigation database 234. The DDoS mitigation control application 232, when executed by the processor 202, performs one or more operations associated with the BGP controller 112 of FIG. 1, as further described herein. In operation, DDoS mitigation control application 232 communicates with targeted computer system 108 via RTC router 110 to receive BGP messages that include, without limitation, an indicator indicating that targeted computer system 108 is undergoing a DDoS attack. DDoS mitigation control application 232 then responds by performing one or more operations to mitigate the DDoS attack, as further described herein. Mitigation database 234 stores information on behalf of DDoS mitigation control application 232 including, without limitation, configuration and routing data to enable BGP controller 112 to communicate with one or more computer systems that may be subject to a DDoS attack, such as targeted computer system 108.

Figure 3:
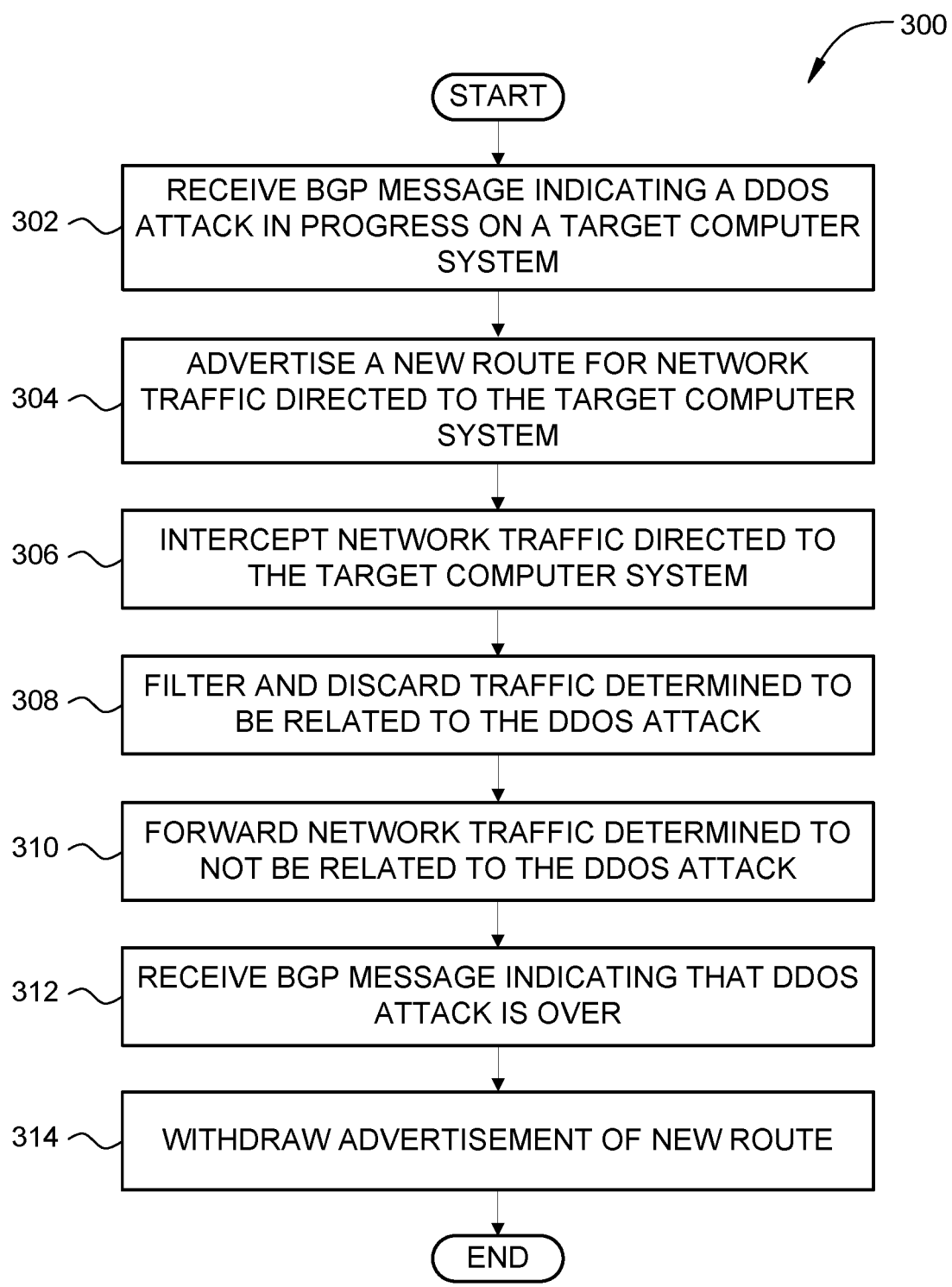
FIG. 3 is a flow diagram of method steps for mitigating a distributed denial of service (DDoS) attack on a targeted computer system, according to various embodiments of the present invention.

FIGS. 3A-3B set forth a flow diagram of method steps for mitigating a distributed denial of service (DDoS) attack on a targeted computer system, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 300 begins at step 302, where BGP controller 112 associated with DDoS attack mitigation platform 120 receives a BGP message that indicates targeted computer system 108 is undergoing a DDoS attack. BGP controller 112 receives the BGP message via router 106, associated with targeted computer system 108, and RTC router 110, associated with DDoS attack mitigation platform 120. The BGP message is received via a private point-to-point connection or via a virtual point-to-point connection, such as a GRE tunnel. The BGP message includes a special indicator indicating that identifies a DDoS attack is in progress, such as a BGP community attribute that is set to a special value. For example, the BGP message could include a BGP community attribute that is set to a value of 911 or some other mutually understood value that indicates a DDoS attack is in progress.

At step 304, BGP controller 112 advertises, via MRI router 116 a new route associated with targeted computer system 108. The new route directs traffic intended for targeted computer system 108 to be routed to mitigation server 114 via MRI router 116. At step 306, the new route causes mitigation server 114 to intercept network traffic directed to target computer system 208. At step 308, mitigation server filters and discards network traffic that is identified as being associated with the DDoS attack. At step 310, mitigation server forwards legitimate network traffic that is identified as not being associated with the DDoS attack. Mitigation server forwards the legitimate network traffic to RTC router 110. RTC router 110 forwards the legitimate network traffic to router 106 which, in turn, forwards the traffic to targeted computer system 108. Because targeted computer system 108 no longer receives network traffic associated with the DDoS attack, targeted computer system 108 is able to recover and begin to respond to requests associated with the legitimate network traffic.

At step 312, when the DDoS attack is over, BGP controller 112 receives a BGP message that indicates targeted computer system 108 is no longer undergoing a DDoS attack. BGP controller 112 receives the BGP message via router 106, associated with targeted computer system 108, and RTC router 110, associated with DDoS attack mitigation platform 120. For example, the BGP message could include a BGP community attribute that is set to a value other than 911 or some other mutually understood value that indicates a DDoS attack is in progress. At step 314, BGP controller 112 withdraws, via MRI router 116 the advertisement of the new route. Withdrawal of the new route causes mitigation server 114 to stop receiving traffic intended for targeted computer system 108 via MRI router 116. Instead, targeted computer system 108 begins receiving this traffic via router 104. The method 300 then terminates.

In sum, a router associated with a DDoS attack mitigation platform receives a BGP message that includes an indicator indicating that a targeted computer system is undergoing a DDoS attack. The DDoS attack mitigation platform advertises a new route for network traffic directed to the targeted computer system. The DDoS attack mitigation platform begins to receive network traffic intended for the targeted computer system and determines what network traffic is associated with the DDoS attack. Network traffic determined to be associated with the DDoS attack is filtered and discarded. Network traffic determined to be legitimate is forwarded to a router. The router, in turn, forwards the legitimate network traffic to a router associated with the targeted computer system. After the DDoS attack is over, the router associated with the DDoS attack mitigation platform receives a BGP message that includes an indicator indicating that the targeted computer system no longer undergoing the DDoS attack. In response, the DDoS attack mitigation platform withdraws the advertised new route and stops receiving network traffic intended for the targeted computer system.

At least one advantage of the disclosed techniques is that the time between detection of a DDoS attack and mitigating the attack is reduced relative to prior approaches. After receiving the BGP message indicating a DDoS attack is in progress, the DDoS attack mitigation platform automatically takes steps to mitigate the DDoS attack without further manual intervention. As a result, the targeted computer system recovers more quickly and begins to respond to legitimate network requests sooner relative to prior approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for mitigating a distributed denial of service (DDoS) attack on a targeted computer system, the method comprising:
    receiving, via a first router during a border gateway protocol (BGP) session, a first BGP message that includes a first indicator indicating that a first computer system associated with the first router is under a DDoS attack;
    in response to receiving the first BGP message, automatically, via a second router coupled to a second computer system, advertising a first route for routing network traffic directed to the first computer system to the second router, wherein a first number of IP addresses specified by the first route is determined based on a second number of IP addresses specified by a second route for routing network traffic directed to the first computer system, wherein the first number is greater than the second number;
    receiving, subsequent to the first route being advertised and via the second router, first network traffic directed to the first computer system;
    determining that at least a portion of the first network traffic is legitimate; and
    transmitting the at least a portion of the first network traffic to the first computing system via the first router.

2. The computer-implemented method of claim 1, wherein the network traffic comprises a first network message, and further comprising:
    detecting that the first network message is associated with the DDoS attack; and
    discarding the first network message.

3. The computer-implemented method of claim 1, further comprising:
    receiving, via the first router, a second BGP message that includes a second indicator indicating that the first computer system is no longer under a DDoS attack; and
    in response to receiving the second BGP message, withdrawing the first route.

4. The computer-implemented method of claim 1, wherein the first indicator comprises a BGP community attribute, and further comprising determining that the BGP community attribute is equal to a first value.

5. The computer-implemented method of claim 1, further comprising withdrawing a second route for routing network traffic directed to the first computer system to the first router associated with the first computer system.

6. The computer-implemented method of claim 1, wherein legitimate network traffic comprises network traffic determined as not being associated with the DDoS attack.

7. A non-transitory computer-readable storage medium including instructions that, when executed by a processor, cause the processor to mitigate a distributed denial of service (DDoS) attack on a targeted computer system, by performing the steps of:
    receiving, via a first router during a border gateway protocol (BGP) session, a first BGP message that includes a first indicator indicating that a first computer system associated with the first router is under a DDoS attack;
    in response to receiving the first BGP message, automatically, via a second router coupled to a second computer system, advertising a first route for routing network traffic directed to the first computer system to the second router, wherein a first number of IP addresses specified by the first route is determined based on a second number of IP addresses specified by a second route for routing network traffic directed to the first computer system, wherein the first number is greater than the second number;
    receiving, subsequent to the first route being advertised and via the second router, first network traffic directed to the first computer system;

determining that at least a portion of the first network traffic is legitimate; and transmitting the at least a portion of the first network traffic to the first computing system via the first router.

8. The non-transitory computer-readable storage medium of claim 7, wherein the first network traffic comprises a first network message, and the processor further performs the steps of:

detecting that the first network message is associated with the DDoS attack; and discarding the first network message.

9. The non-transitory computer-readable storage medium of claim 7, further comprising:

receiving, via the first router, a second BGP message that includes a second indicator indicating that the first computer system is no longer under a DDoS attack; and in response to receiving the second BGP message, withdrawing the first route.

10. The non-transitory computer-readable storage medium of claim 7, wherein the first route specifies a different number of internet addresses than a second route advertised by the first router.

11. The non-transitory computer-readable storage medium of claim 7, wherein a second route is withdrawn, and wherein the second route causes network traffic to be directed to the first router.

12. The non-transitory computer-readable storage medium of claim 7, wherein the first BGP message is received via a generic routing encapsulation (GRE) tunnel.

13. The non-transitory computer-readable storage medium of claim 7, wherein the processor further performs the step of withdrawing a second route for routing network traffic directed to the first computer system to the first router associated with the first computer system.

14. A computing device, comprising:

a memory that includes a distributed denial of service (DDoS) mitigation application; and a processor that is coupled to the memory and, when executing the DDoS mitigation application, is configured to:

receive, via a first router during a border gateway protocol (BGP) session, a first BGP message that includes a first indicator indicating that a first computer system associated with the first router is under a DDoS attack;

in response to receiving the first BGP message, automatically, via a second router coupled to a second computer system, advertise a first route for routing network traffic directed to the first computer system to the second router, wherein a first number of IP addresses specified by the first route is determined based on a second number of IP addresses specified by a second route for routing network traffic directed to the first computer system, wherein the first number is greater than the second number;

receive, subsequent to the first route being advertised and via the second router, first network traffic directed to the first computer system;

determine that at least a portion of the first network traffic is legitimate; and transmit the at least a portion of the first network traffic to the first computing system via the first router.

15. The computing device of claim 14, wherein the network traffic comprises a first network message, and the processor is further configured to:

detect that the first network message is associated with the DDoS attack; and discard the first network message.

16. The computing device of claim 14, wherein the processor, when executing the DDoS mitigation application, is further configured to:

receive, via the first router, a second BGP message that includes a second indicator indicating that the first computer system is no longer under a DDoS attack; and in response to receiving the second BGP message, withdraw the first route.

17. The computing device of claim 14, wherein the processor, when executing the DDoS mitigation application, is further configured to verify that a routing prefix associated with the first BGP message is related to the first computer system.

18. The computing device of claim 14, wherein the processor is further configured to withdraw a second route for routing network traffic directed to the first computer system to the first router associated with the first computer system.

* * * * *